United States Patent
Adams, Sr.

[15] 3,645,306
[45] Feb. 29, 1972

[54] ANGLE GUIDE FOR ELECTRIC SAW AND ROUTER

[72] Inventor: George F. Adams, Sr., 2740 N.W. 172 Ter., Opa-Locka, Fla. 33054

[22] Filed: July 17, 1970

[21] Appl. No.: 55,628

[52] U.S. Cl..............................143/6 G, 143/43 E, 143/47 F, 143/132 A, 144/136 R, 143/169
[51] Int. Cl........................................................B27b 9/04
[58] Field of Search...................143/6 R, 6 A, 6 G, 6 J, 43 E, 143/47 R, 47 B, 47 F, 132 A, 89, 89 B, 168, 169; 144/1 E, 134 R, 136 R, 144.5, 1 F

[56] References Cited

UNITED STATES PATENTS

| | | | |
|---|---|---|---|
| 1,751,816 | 3/1930 | Hunter | 144/144.5 |
| 2,911,017 | 11/1959 | Holder | 143/6 G |
| 3,073,360 | 1/1963 | Villanueva | 143/6 G |
| 3,304,967 | 2/1967 | Kujan | 143/6 G |
| 3,368,594 | 2/1968 | Drumbore | 143/6 G |

Primary Examiner—William S. Lawson
Assistant Examiner—James F. Coan
Attorney—M. A. Baskin

[57] ABSTRACT

A saw guide adapted for use particularly with a portable motor-driven saw of the circular blade type or router which guide is adjustable to align the saw blade in either the rip position or crosscut position or gradients thereof in relation to the wood or material to be sawed in a manner which saves time and labor and assures the accuracy of the predetermined line along which the saw blade is to travel and worktable therefore.

9 Claims, 3 Drawing Figures

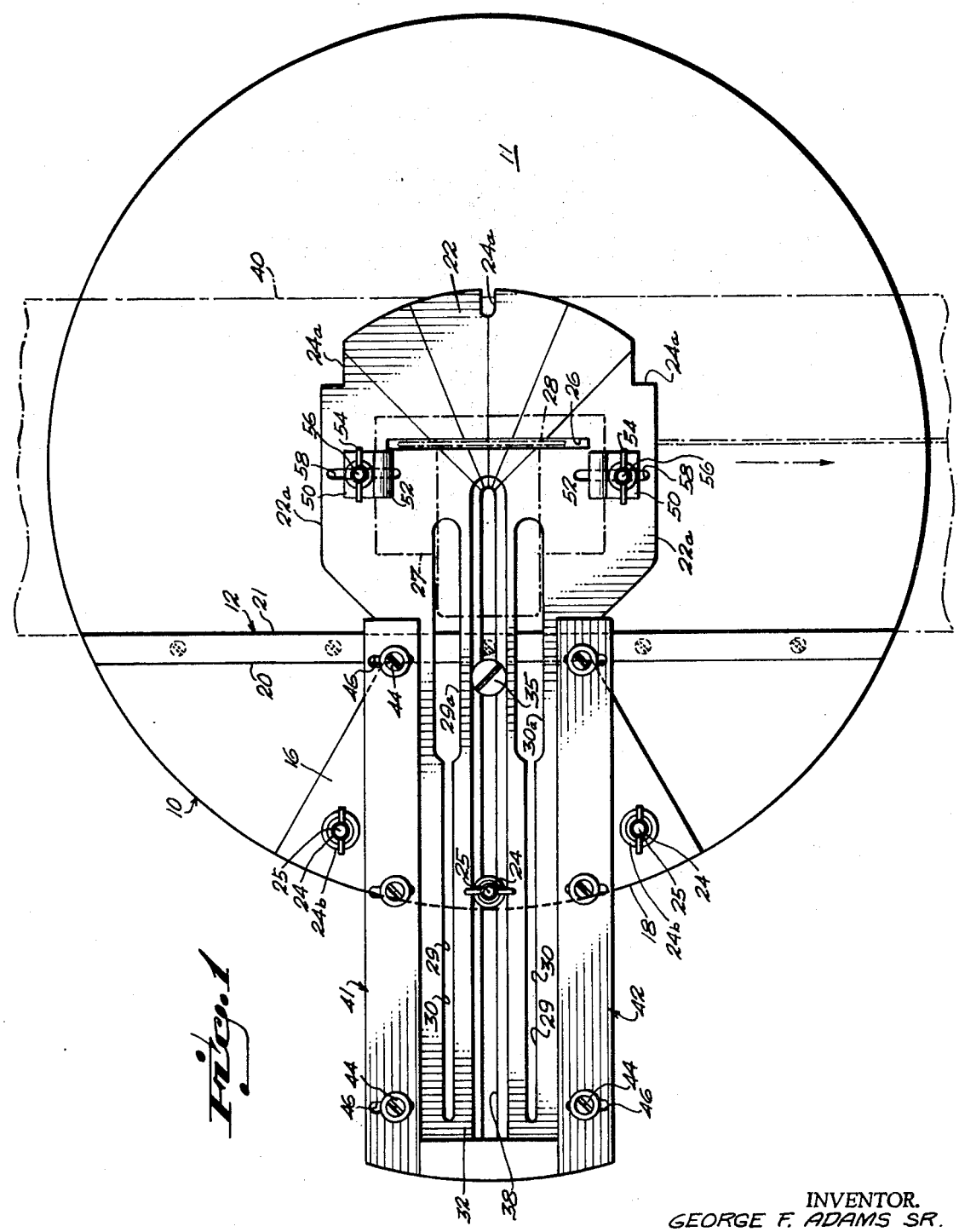

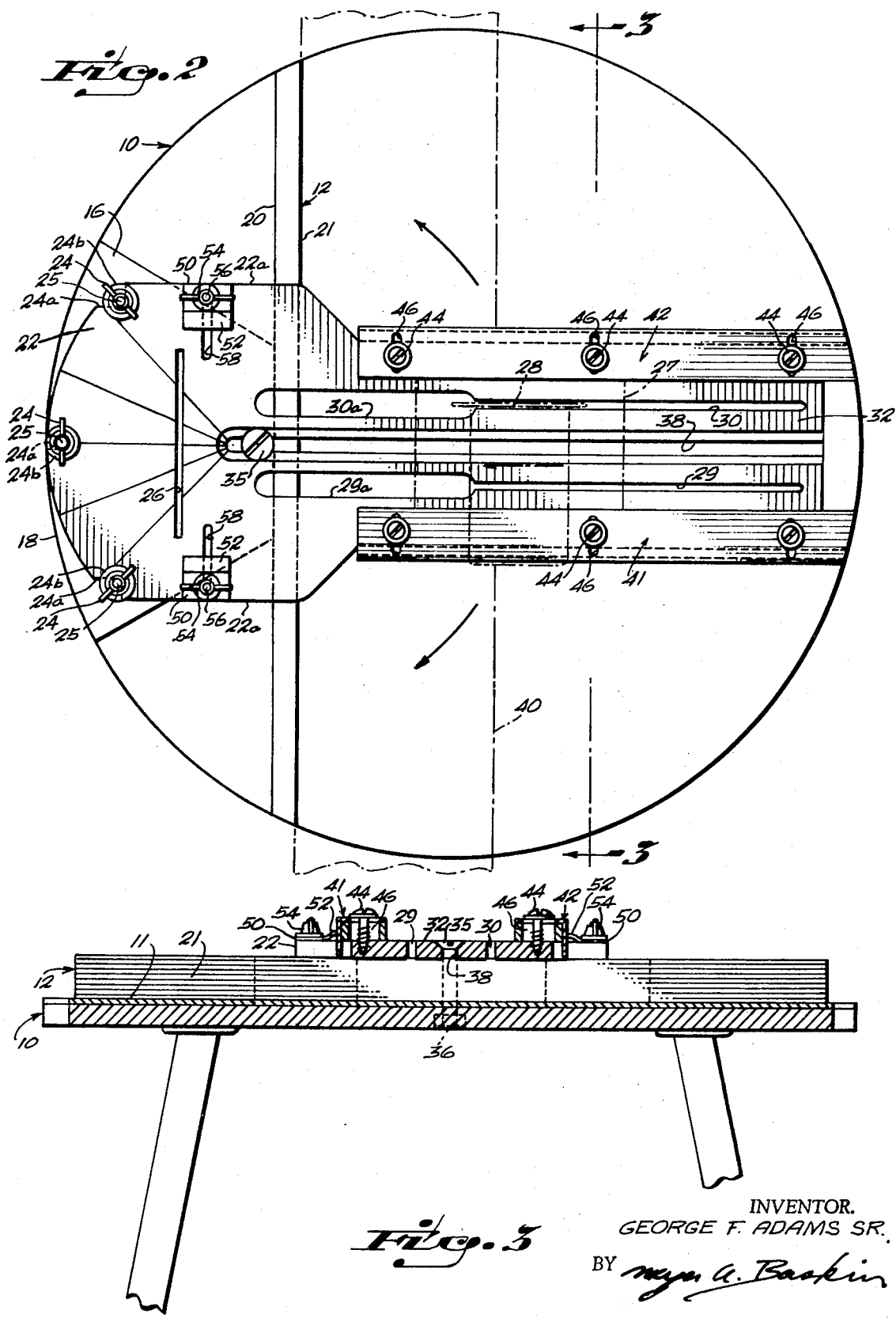

ANGLE GUIDE FOR ELECTRIC SAW AND ROUTER

BACKGROUND OF THE INVENTION

1. Field of the Invention

Saw Guide for portable motor driven saws of the circular blade type and worktable therefore.

2. Description of the Prior Art

The prior art which appears to relate generally to this invention consists of a group of patents which do not have the simplicity of the saw guide of this invention nor do they disclose guide means for hand-operated rotary power saws which assure the accuracy of the predetermined line along which the saw blade is to travel while at the same time providing a guide of strength and durability which will function efficiently over a prolonged period of use as does the saw guide of this invention.

Some examples of the prior art include the U.S. Pat. No. 2,651,333 to Spinney, which discloses a complex hinged worktable fixture for portable motor-driven saws which is not adaptable for rip saw use but is restricted to crosscut or router operation only. Another type of saw guide for a portable power saw is disclosed in the U.S. Pat. No. 2,719,548 to Mitchell, this disclosure also is limited in use to crosscut or router operation only and in addition requires the use of expensive elongated tension springs not required in this invention. U.S. Pat. No. 3,304,967 to Kujan, discloses an expensive saw guide which requires the use of an expensive slotted tubular track as the guide means and also an expensive hinged protractor plate not needed in this invention. U.S. Pat. No. 3,124,176 to Vogini, discloses a adjustable jig for cutting wood which is complex to assemble, costly to manufacture, is restricted to crosscut or router operation and lacks the simplicity and durability of the saw guide of this invention.

None of this prior art anticipates this invention. No sturdy, simple to manufacture, and relatively inexpensive saw guide which is both of lower cost to produce and reliable, accurate and easy to use and which is also both uncomplicated and durable, as is the saw guide of this invention, has previously been available.

SUMMARY OF THE INVENTION

The present invention is an improvement in saw guides for portable motor driven saws of the circular blade type. It comprises in essence a workbase of substantial size, preferably in the form of a large round platform, which may be as much as 3 feet in diameter, although other sizes are contemplated. This workbase platform has a diametrically disposed elevated straight line guide member fixed to the top side of said workbase platform extending across the platform and located between the exact center of the round platform and its outer periphery. In the form of this invention, chosen for purposes of illustration, the elevated straight line guide member is located about one-third of the distance from the center of the round workbase platform and one edge of the outer periphery or the circumference at that particular side of the platform. The elevated straight line guide member extends entirely across the top of the work platform from one portion of its periphery to the other.

An elevated member, in the form of a sector of a triangle is also fixed to the top of the round workbase platform and extends from the elevated straight line guide member, before described, to the periphery of the round workbase. This elevated member occupies the space between the outer side of the elevated straight line guide and the outer periphery of the workbase. The sides of said elevated triangular member extend inwardly to intersect the outer side of the straight line guide and the outer leg or side of said triangular member conforms to the periphery of the outer extremity of the round workbase platform.

A relatively thin plate is provided which is adapted to be the guide for the portable motor saw of this invention and is secured to the top side of the elevated portions of the round workbase by suitable wing nuts and screws or threaded bolts permitting the guide to be readily fixed in either the rip saw position or in the crosscut or router position as may be desired.

BRIEF DESCRIPTION OF THE DRAWINGS

FIG. 1, shows a plan view of the saw guide fixed in the rip position with the board of wood or other material to be cut lengthwise by the portable saw passing under the circular blade thereof;

FIG. 2, shows a plan view of the saw guide fixed in the crosscut position whereby the board or other material may be crosscut by the portable saw crosswise at right angles or gradients thereof as desired; and FIG. 3, shows a vertical section taken along the line 3—3 of FIG. 2 looking in the direction indicated by the arrows.

Referring now to the drawings in detail in which like numerals refer to like parts throughout the several views, the numeral 10 indicates in general a round worktable having a horizontally disposed worksurface 11. Worksurface 11 may be a disposable workbase and about one-fourth of an inch thick and it maY be of wood, plastic, such as plexiglass or other suitable material. The worktable 10 may be supported by legs as shown in FIG. 3 or by any other well-known suitable means. An elevated straight line work guide, indicated in general by the numeral 12, is fixed to the horizontal work surface 11 approximately one-third of the distance from the center of the round worktable 10 and the outer periphery of said table 10 and is preferably of plywood. An elevated member 16, in the form of a sector of a triangle is also fixed to the horizontal work surface 11 of the round work table 10 and extends from the elevated straight line workguide 12 to a peripheral edge 18 of the horizontally disposed work surface 11 of the round worktable 10. The triangular-shaped member 16 is elevated above the horizontal worksurface 11 to the same height as the elevated straight line work guide 12 wherefore the top of the straight line work guide 12 and that of the approximately triangular-shaped elevated member 16 lie in the same horizontal plane.

The apex of the triangular-shaped elevated member 16 extends inwardly and if projected far enough it would lie near the center of the round worktable 10, but as shown in FIGS. 1 and 2 of the drawings, the elevated member 16 is arranged to engage the outer edge 20 of the elevated straight line work guide 12.

A relatively thin saw guide 22 is mounted above the elevated straight line work guide 12 and the elevated member 16 and may be held in position by a series of wing nuts 24 which are screw threaded on a series of complementary bolts 25, which extend upwardly through three notches 24a formed in the periphery of saw guide plate 22, as shown in FIGS. 1 and 2 of the drawings.

A cross slot 26 is cut in one end of the saw guide 22 and is adapted to receive the circular blade 28 of the portable motor-driven saw 27, when it is arranged in the rip position as shown in FIG. 1.

A pair of longitudinally extending parallel slots 29 and 30 are formed in the longitudinally extending portion 32 of the saw guide plate 22 and are adapted to receive the circular blade 28 of the portable motor-driven saw 27 when it is arranged in the crosscut position as shown in FIG. 2. An elongated center bevel edged slot 38 of guide plate 22 is longitudinally disposed between and parallel to the pair of longitudinally extending slots 29 and 30 which are formed in the longitudinally extending portion 32 of the guide plate 22. Countersunk bolt 35 extends through the round worktable 10 and is engaged by a nut 36 as shown in FIGS. 1, 2 and 3 of the drawings. This bolt 35 having a countersunk head and nut 36 serve to fix the guide plate 22 securely in any desired position to the round worktable 10 above the work surface 11 thereof and may be removed entirely for the purpose of changing the guide plate 22 from the rip saw position shown in FIG. 1, if desired, and subsequently reinstalled. Alternatively the change from rip to crosscut or vice versa can be done by loosening bolt 35 as described below.

In FIG. 1, the portable power saw 27 with its circular rotating blade 28 is shown fixed in position for rip sawing a board 40, which board is moved in the direction indicated by the arrow, the board 40 is guided by maintaining sliding contact of one of its side edges along the inner edge 21 of the elevated straight line work guide 12. The precise line along which board 40, of wood or other material, is to be rip sawed is readily determined by adjusting the guide plate 22 and fixing it in the desired position relative to the inner edge 21 of the straight line work guide 12 through the use of bolt 35 and nut 36 and the centrally disposed wing nut 24 and bolt 25.

In FIG. 2 the saw guide plate 22 has been reversed in position as shown, by use of countersunk bolt 35 and nut 36, and wing nuts 24 and bolts 25. This places the portable power saw 27 with its circular rotating blade 28 in position for crosscutting a board 40, of wood or other material.

Four important, beneficial advantages of this invention are apparent in the crosscutting operation as shown in FIG. 2.

First, the provision of two parallel longitudinally extending slots 29 and 30 which are formed in the longitudinally extending portion 32 of the saw guide 22 and which are each adapted to receive the circular blade 28 of the portable motor-driven saw 27 permits the use of right and left-sawing techniques, that is the portable saw 27 with circular rotating saw blade 28 may be arranged in slot 29, as shown in FIG. 2, and moved in one direction, sawing from right to left as indicated by the direction of the arrow. The portable saw 27 with circular rotating blade 28 may then be reversed with the blade 28 arranged in slot 30 and moved in the opposite direction, that is sawing from left to right.

Second, right or left-hand portable saws of standard makes can be used with the guide of this invention.

Third, as shown in FIG. 2 of the drawings, the horizontal slots 29 and 30 may be considerably wider at one end, the left ends of slots 29 and 30 are widened at 29a and 30a to permit easy visual observation of the sawing operation which may be an important advantage in many situations.

Fourth, the saw guide plate 22 may be rotated, as indicated by the arrows in FIG. 2, to serve as an angle guide of many gradients, by loosening wing nuts 24, the countersunk bolt 35 and nut 36 and selecting the exact angle and line on which it is desired to guide the saw 27 and its circular rotating blade 28, setting the saw guide plate 22 in that position and then tightening up the wing nuts 24 and the countersunk bolt 35 and nut 36 to fix the saw guide plate 22 securely in the angular position desired.

To make a 90° or straight cut across a board 40 the saw guide plate 22 is set in the position shown in FIG. 2 with the longitudinally extending portion 32 thereof disposed directly over board 40 to be crosscut and it is maintained in fixed position by tightening wing nuts 24 on bolts 25 which have been fitted into notches 24a of the saw guide plate 22, and also tightening up the countersunk bolt 35 and nut 36. This will fix the saw guide plate 22 securely and quickly in the 90° angle desired without measuring.

If the commonly used 45° angle cut is desired the saw guide plate 22 may be moved by loosening the wing nuts 24 on their respective bolts 25 and loosening the countersunk bolt 35 and nut 36 and moving the saw guide plate 22 toward the center of the worktable 10 a short distance sufficient to permit the notches 24a to clear the bolts 25 then rotating the saw guide plate 22 in the direction of either of the two arrows shown in FIG. 2 until two of the three notches 24a of the saw guide plate 22 are in fitting alignment with two of the bolts 25, moving the saw guide plate 22 a short distance back in to contact with said bolts 25 and then tightening the two wing nuts 24 on said bolts 25 and also tightening countersunk bolt 35 and nut 36 to fix saw guide plate 22 in the desired 45° angle to assure a 45° crosscut without other measuring.

It is preferable to use a wingnut 24 of the type which has a horizontally extending flange 24b at its base as shown in FIGS. 2 and 3 to assure a secure fit and firm contact with the top surface of saw guide plate 22.

Another novel and useful feature included in the combination of elements which comprise this invention includes the provision of a pair of adjustable parallel elongated side guide elements for the portable saw 27 and the easy manner in which they can be adjusted. Referring now particularly to FIGS. 2 and 3 of the drawings there is disclosed a pair of elongated raised side saw guides 41 and 42. One of said guides 41 and 42 are mounted along each of the parallel side edges of the longitudinally extending portion 32 of saw guide plate 22 and are fixed thereto by screws 44 which pass through slots 46 which are disposed at right angles to the saw guides 41 and 42. It is therefore possible to move the pair of elongated parallel saw guides 41 and 42 closer together or further apart or perfect their alignment by loosening the screws 44 and move said saw guides by reason of cross slots 46 as desired and then fix them in operative position by tightening screws 44 which enter portion 32 of the saw guide plate 22. Thus by adjusting the space between raised saw guides 41 and 42 as explained above, standard makes of motor-driven saws 27 having different width base plates may be used.

Indicator markings may be painted, printed, embossed or otherwise imposed along elongated slots 29, 30, and 38 on the surface of the longitudinally extending portion 32 of saw guide plate 22 or in the arcuate manner of a protractor along a 90° peripheral edge and on the surface of the wider end of saw guide plate 22. These indicator markings may be utilized in presetting angles or controlling lengths of movement to facilitate guidance of the portable saw 27 and its circular blade 28, particularly in performing crosscutting work at any desired angle.

Another novel and useful feature included in the combination of elements which comprise this invention is the provision of a pair of adjustable clamps so shown in FIGS. 1 and 2 which are adapted to hold the portable motor-driven saw 27 in secure fixed position when sued as a rip saw. These clamps 50 include inwardly extending brackets 52 which are adapted to extend over the outwardly protruding base edges of the saw 27 and have wingnuts 54 mounted on bolts 56 which extend through slots 58. Thus the clamps may be moved inwardly and outwardly by loosening the wing nuts 54 and moving the bolts 56 inwardly or outwardly through slots 58 until they have reached the desired position and then tightening the wing nuts 54 on the bolts 56 to fix the clamp 50 in that position.

This feature permits the use of standard make portable saws or those having different size base plates.

When a router is to be used it extends through the center beveled longitudinally extending slots 38 of the longitudinally extending portion 32 of saw guide plate 22. The slot 38 must be of sufficient width to accommodate a router bit shank having a diameter of one-half inch or less.

A further novel and useful feature of this invention is the provision of a pair of parallel side edges 22a on the portion of the saw guide plate 22 which supports the portable power-driven saw 27 when the guide plate 22 is in position for rip sawing. These parallel side edges permit the changing of the guide plate 22 from the rip saw position as shown in FIG. 1 to the crosscut position as shown in FIG. 2 and from the crosscut position shown in FIG. 2 back to the rip saw position shown in FIG. 1 without removal of the countersunk bolt 35 and nut 36. To change from either the rip position to the crosscut position all that needs to be done is to loosen the countersunk bolt 35 and nut 36 and the three sets of wingnuts 24 on their respective bolts 25 and rotate the guide plate 22 on the countersunk bolt 35 and move the guide plate 22 along the elongated bevel edged slot 38. The provision of the pair of parallel side edges 22a permits the guide plate 22 to slide past and clear the bolts 25 and the saw guide 22 may thus be changed from the rip position of FIG. 1 to the crosscut position of FIG. 2 without removal of bolt 35 and nut 36. This is an important feature which saves much time and labor. When the desired change of position from rip saw position to crosscut position, or back, has been accomplished as described the countersunk bolt 35 and nut 36 and the wing nuts 24 and their respective bolts 25 are tightened and the guide 22 and its longitudinally extending portion 32 will then be securely fixed above the work in operating condition.

Other novel and important feature of this invention contemplate the use of a router when the guide plate 22 is in the rip position as in FIG. 1. This is accomplished by removal of the saw 27 and replacing it with a router. In this arrangement the router, using various bits, may serve as a shaper or plane with the work being introduced through the guide 22 in the same manner as the work is introduced when saw 27 is in the rip position. This feature lends more versatility to the guide 22 of this invention in that guide 22 may be used to guide a router in both the rip position of the portable saw guide 22 as shown in FIG. 1 and in the crosscut position of guide 22 and its extending portion 32 as shown in FIG. 2.

Attention is also directed to the provision of a round worktable 10, if desired, which provides ease of portability so that the workman may roll the complete assembly from job to job in use. This feature is important if the worktable is of 3 feet or more in diameter. The supporting legs are optional and are of a type which are easy to install and remove.

This invention also contemplates that the entire top of the worktable 10, that is the worksurface 11 may be made of disposable materials which may be easily obtained, easily fabricated and inexpensive, including masonite of one-quarter inch in thickness also the work guide 12 which is preferably made of plywood or laminated material which may be easily disposed of an inexpensively replaced if it becomes worm through the sawing operations.

While the preferred embodiment of this invention has been illustrated and described herein it is to be understood that no limitation has been placed on the precise construction herein disclosed and that various changes and modifications are contemplated.

I claim:

1. A saw guide for portable motor-driven saws of the circular blade type and a horizontally disposed worktable therefor which guide is adjustable to align the saw blade for sawing in either the rip position or crosscut position or gradients of the crosscut position in relation to the work to be sawed, said saw guide and worktable comprising in combination:
   a. A horizontally disposed worktable
   b. A horizontally disposed worksurface covering the top of said worktable
   c. An elevated straight line work guide fixed to the top of said worksurface of the said work table
   d. An elevated member also fixed to the top of said worksurface of the said worktable and extending from the elevated straight line work guide to the peripheral edge of the said work table
   e. The top of elevated straight line work guide being elevated to the same height as the top of the elevated member so that their top surfaces lie in the same horizontal plane.
   f. A relatively thin horizontally disposed saw guide plate adjustably mounted above and secured to the top surface of the said elevated member
   g. A series of wingnuts which are screw threaded on a series of complementary vertically disposed bolts which extend up upwardly the peripheral edge of the said worktable from said table
   h. Three notches in the periphery of one end of the saw guide plate are adapted to snugly receive said complimentary wingnuts
   i. A cross slot cut in said end of the saw guide plate and adapted to receive the circular saw blade of he portable motor-driven saw when sawing in the rip position
   j. An elongated longitudinally extending member of the saw guide plate having a pair of parallel longitudinally extending slots each adapted to receive the circular saw blade of the portable motor-driven saw when sawing in the crosscut position
   k. An elongated longitudinally extending center slot extending between and parallel to the pair of saw blade slots which receive the circular saw blade for crosscutting said center slot adapted to receive a router, and
   l. A countersunk bolt vertically disposed in said center slot and adapted to adjustably fix the elongated longitudinally extending member of the saw guide plate in horizontal operative position.

2. A saw guide for portable motor-driven saws of the circular blade type and a horizontally disposed worktable therefore, as described in claim 1, wherein said horizontally disposed worktable (a) is round in shape, said elevated straight line work guide (c) is located about one-third of the distance from the center of the round worktable to the outer periphery of said table.

3. A saw guide for portable motor-driven saws of the circular blade type and a horizontally disposed worktable therefor, as described in claim 1, wherein the horizontally disposed worksurface covering the top of said worktable is disposable and is easily removable and replaceable.

4. A saw guide for portable motor-driven saws of the circular blade type and a horizontally disposed worktable therefore, as described in claim 1, wherein the elevated straight line guide fixed to the top of the worksurface is disposable and is easily removable and replaceable.

5. A saw guide for portable motor-driven saws of the circular blade type and a horizontally disposed worktable therefore, as described in claim 1, wherein the relatively thin horizontally disposed saw guide plate, which is adjustably mounted above and secured to the top surface of the elevated shaped member, has indicator length markings imposed on the top surface of said saw guide plate along the pair of parallel elongated longitudinally extending slots which are adapted to receive the circular saw blade when sawing in the crosscut position, additional indicator markings in the arcuate form of a protractor are imposed on the top surface of said saw guide plate adjacent the outer peripheral edge of that end of the saw guide plate in which the cross slot is cut which is adapted to receive the saw blade when sawing in the rip position, said additional indicator markings in the arcuate form of a protractor shall indicate and are extending at least from 0° to 90° and additional indicator length markings are imposed on the top surface of said saw guide plate along the elongated longitudinally extending bevel edged center slot, which extends between and is parallel to the pair of parallel elongated longitudinally extending saw blade slots which receive the circular saw blade for crosscutting, said center slot being adapted to receive a router.

6. A saw guide for portable motor-driven saws of the circular blade type and a horizontally disposed worktable therefore, as described in claim 1, which includes a pair of longitudinally extending adjustable parallel elongated raised side guide elements for the portable saw, one of said guide elements is disposed along each outer most edge of the elongated longitudinally extending portion of the saw guide plate and the top surface of each of said raised side guide elements lies in the same horizontal plane, the top surface of the elongated longitudinally extending portion of the saw guide lies in a lower horizontal plane than that of said side guide elements, the side guide elements are adjustably fixed to the saw guide plate by a series of screws which pass through a series of slots which extend at right angles to the sides of said saw guide plate, said screws are adapted to be loosened to permit movement of said raised side guide elements closer together or farther apart to accommodate the width of the saw base and then tightened to fix them in operative position.

7. A saw guide for portable motor-driven saws of the circular blade type and a horizontally disposed worktable therefor, as described in claim 1, wherein, the said three notches (h) are positioned to hold said saw guide plate (f) at a 90° angle relative to said straight line work guide (c) and by moving said saw guide plate a short distance said notches are disengaged from said bolts and said saw guide plate can be rotated to a 45° angle in either direction, moved back a short distance to engage two of said notches with said bolts thus holding said saw guide plate in either 45° angle relative to said straight line work guide (c).

8. A saw guide for portable motor-driven saws of the circular blade type and a horizontal disposed worktable therefore, as described in claim 1, which includes a horizontalLY disposed saw guide plate having two portions, one portion having a slot cut therein adapted to receive the circular saw blade when rip sawing, the other elongated portion having parallel slots cut therein adapted to receive the circular saw blade when crosscut sawing, said horizontally disposed saw guide plate adapted to be rotated to either rip saw position or crosscut position about a center pivot comprising a counter sunk vertically disposed bolt and nut, said vertically disposed bolt extending upwardly through the bevel edged elongated center slot of the elongated portion of the saw guide plate, that portion of the saw guide plate adapted to receive the circular saw blade for rip sawing having a pair of straight parallel outer side edges adapted to clear the peripherally disposed fastening means which fix said rip saw slotted portion of said guide plate in operative position when the center pivot and outer peripherally disposed fastening means and said center pivot are loosened permitting the saw guide plate to slide horizontally along and be simultaneously rotated about said center pivot.

9. A saw guide for portable motor-driven saws of the circular blade type and a horizontally disposed worktable therefore as described in claim 1, which includes a pair of adjustable clamps adapted to fix the portable saw in secure position when used as a rip saw, said pair of clamps each include inwardly extending brackets adapted to extend over the outwardly protruding base edges of the saw, a pair of slots formed in one end of the saw guide plate and extending at right angles to the elongated saw guide slots of the elongated portion of the saw guide plate which are used for crosscutting, a vertically disposed upwardly protruding bolt disposed in each of said right angle slots, and a wing nut screw threaded on each upwardly protruding bolt adapted to fix the clamps and portable saw in the desired position for rip saw cutting.

* * * * *